(12) United States Patent
Kurian et al.

(10) Patent No.: US 10,771,308 B2
(45) Date of Patent: *Sep. 8, 2020

(54) REQUEST PROCESSING SYSTEM USING A COMBINING ENGINE

(71) Applicant: Bank of America Corporation, Charlotte, NC (US)

(72) Inventors: Manu J. Kurian, Dallas, TX (US); Saritha P. Vrittamani, Plano, TX (US); Jeff T. Burch, Stevensville, MI (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,523

(22) Filed: Aug. 6, 2019

(65) Prior Publication Data

US 2019/0363923 A1    Nov. 28, 2019

Related U.S. Application Data

(63) Continuation of application No. 15/825,705, filed on Nov. 29, 2017, now Pat. No. 10,419,265.

(51) Int. Cl.
| | | |
|---|---|---|
| *H04L 29/08* | (2006.01) | |
| *H04L 29/06* | (2006.01) | |
| *H04L 12/24* | (2006.01) | |

(52) U.S. Cl.
CPC .. *H04L 29/08765* (2013.01); *H04L 29/06081* (2013.01); *H04L 29/06476* (2013.01); *H04L 67/2833* (2013.01); *H04L 67/2838* (2013.01); *H04L 41/0836* (2013.01)

(58) Field of Classification Search
CPC ......... H04L 29/06081; H04L 29/06476; H04L 29/08765; H04L 41/0836; H04L 67/2833; H04L 67/2838
See application file for complete search history.

(56) References Cited

U.S. PATENT DOCUMENTS

| | | | |
|---|---|---|---|
| 6,094,655 A * | 7/2000 | Rogers | ............. G06F 16/958 |
| 6,199,131 B1 | 3/2001 | Melo et al. | |
| 6,298,407 B1 | 10/2001 | Davis et al. | |
| 6,901,486 B2 | 5/2005 | Handgen et al. | |
| 6,970,978 B1 | 11/2005 | Wu | |
| 6,996,645 B1 | 2/2006 | Wiedenman et al. | |
| 7,020,741 B1 | 3/2006 | Tischler | |

(Continued)

*Primary Examiner* — Kostas J Katsikis
(74) *Attorney, Agent, or Firm* — Michael A. Springs (57) ABSTRACT

A system includes a request processing system which enables the system to fulfill data requests by grouping and combining requested data elements, while conserving computing resources and increasing security of the requested data elements associated during storage and transmission over a network. The system is configured to identify one or more groups of data elements associated with one or more identifiers, each data element in a group associated with a component of an identifier. The system combines each of the one or more groups of data elements based on a unique association between the components of each identifier. The system subsequently removes the sub-wrappers from the data elements in the one or more groups of data elements, and sends the combined one or more groups of data elements to relevant requestors.

10 Claims, 7 Drawing Sheets

(56) References Cited

U.S. PATENT DOCUMENTS

| | | | |
|---|---|---|---|
| 7,035,984 B2 | 4/2006 | Mastronarde et al. | |
| 7,076,614 B2 | 7/2006 | Sperber et al. | |
| 7,603,526 B2 | 10/2009 | VanStee et al. | |
| 7,636,813 B2 | 12/2009 | Tremaine | |
| 7,890,388 B2 * | 2/2011 | Mariotti | G06Q 10/08 |
| | | | 705/28 |
| 7,890,708 B2 | 2/2011 | Barrett et al. | |
| 8,612,315 B2 * | 12/2013 | Mariotti | G06Q 10/08 |
| | | | 705/28 |
| 8,639,902 B2 | 1/2014 | Jeddeloh | |
| 9,032,162 B1 | 5/2015 | Chang et al. | |
| 9,606,926 B2 | 3/2017 | Garg et al. | |
| 9,658,962 B2 | 5/2017 | Meredith | |
| 10,067,789 B2 * | 9/2018 | Fang | G06F 9/4881 |
| 10,419,265 B2 * | 9/2019 | Kurian | H04L 67/2838 |
| 10,516,617 B2 * | 12/2019 | Anderson | H04L 47/12 |
| 2006/0100941 A1 * | 5/2006 | Mariotti | G06Q 10/087 |
| | | | 705/28 |
| 2008/0212474 A1 * | 9/2008 | Castaneda | H04L 47/10 |
| | | | 370/235 |
| 2010/0070448 A1 | 3/2010 | Omoigui | |
| 2010/0095066 A1 | 4/2010 | Rodgers et al. | |
| 2011/0112978 A1 * | 5/2011 | Mariotti | G06Q 10/083 |
| | | | 705/330 |
| 2013/0086336 A1 | 4/2013 | Canepa et al. | |
| 2013/0132721 A1 * | 5/2013 | Busser | H04L 9/3263 |
| | | | 713/168 |
| 2013/0166855 A1 | 6/2013 | Batwara et al. | |
| 2013/0262425 A1 | 10/2013 | Shamlin et al. | |
| 2014/0188918 A1 | 7/2014 | Shamlin et al. | |
| 2016/0321104 A1 * | 11/2016 | Fang | G06F 9/4881 |
| 2019/0087198 A1 | 3/2019 | Frascati et al. | |
| 2019/0165987 A1 * | 5/2019 | Kurian | H04L 29/08765 |
| 2019/0166172 A1 * | 5/2019 | Kurian | H04L 63/14 |
| 2019/0363923 A1 * | 11/2019 | Kurian | H04L 67/2833 |

* cited by examiner

REQUEST PROCESSING SYSTEM USING A COMBINING ENGINE

CROSS-REFERENCE TO RELATED APPLICATIONS

This application is a continuation of U.S. patent application Ser. No. 15/825,705 filed Nov. 29, 2017, by Manu J. Kurian et al., and entitled "Request Processing System Using A Combining Engine," which is incorporated herein by reference.

TECHNICAL FIELD

This disclosure relates generally to fulfilling data requests, and more particularly to grouping and combining requested data elements using a combining engine.

BACKGROUND

Today's network environment calls for large amounts of data to be collected, aggregated, transformed, and stored in databases. New data may be received and gathered in a continuous manner or sequentially. Users of the network may request these data from relevant databases. Request results may be generated by accessing data elements in a relevant database and manipulating them in a way that yields the requested information. For example, a system may receive a large number of data elements in response to various requests. And these data elements may be fetched from various data repositories. Under certain circumstances, these data elements may need to be grouped and combined in a certain way to fulfill multiple requests. The system may need a mechanism to group and combine the data elements and return the combined data elements to relevant requestors. Conventional systems may lack a mechanism to group and combine the data elements. On the other hand, the requests themselves, may be manipulated in a way that they are properly processed to reach a desired goal. For example, the system may receive a large number of data requests from users at a given time interval (e.g., a day, an hour). The system may need to handle them in a timely fashion to meet the users' need.

Often times, a data request may request data elements of different types. For example, the data request may request a first data element comprising confidential data, and a second data element comprising public data. These different types of data elements may be stored in different data repositories, which may be located in different geographic locations. Therefore, the data request may need to be sent to multiple data repositories to fetch the data elements of different types. Conventional systems may send a data request to a first data repository to fetch a first data element, then to a second data repository to fetch a second data element. However, such sequential operation increases processing time and is not time efficient. Alternatively, conventional systems may send duplicative data requests to two data repositories. But this consumes more computing resources such as memory and bandwidth.

Furthermore, the requests and the requested information may face malicious network activities during storage and transmission over the network. Conventional systems may be unable to provide adequate network security to secure the requests and the requested information during storage and transmission over the network. As a result, these requests and the requested information may be vulnerable to attacks by malicious actors over the network.

Therefore, it is desirable to provide a solution that reduces request processing time and increases overall throughput while conserving computing resources and securing the requests and the requested information.

SUMMARY

Some of the technical challenges that occur when processing a large number of requests involve aggregating the requests, optimizing them for processing, as well as data security and integrity during transmission over a network. For example, sending a single request to multiple data repositories sequentially may increase processing time for the request, thereby may jeopardizing the request or subsequent requests by failing to meet a time requirement. On the other hand, sending duplicative requests to multiple data repositories consumes double computing resources such as memory and bandwidth. Such techniques that conventional systems may adopt could also create network traffic due to increased processing time and computing resources, thereby reducing an overall throughput of the systems.

Furthermore, the requests and the requested information may face malicious network activities during transmission over the network. For example, a malicious actor over the network may intercept a request and inject a malware in the request. Then, the malicious actor may use the malware to exfiltrate confidential data from a database where the request is sent. In another example, a malicious actor over the network may intercept a requested data element and attach a malware to the data element. The malicious actor may disguise the malware as a legit data element. A requestor may receive the data element and store it in a device without knowing that it is a disguised malware. Then, the malicious actor may use the malware to exfiltrate confidential data from the device that receives the disguised malware. Furthermore, conventional systems may be unable to provide adequate network security to secure the requests and the requested information. As a result, these requests and the requested information may be vulnerable to attacks by malicious actors over the network.

The system described in the present application provides a technical solution that enables the system to reduce request processing time, increase overall throughput of the system while conserving computing resources, and increase data security associated with the requests during transmission.

In some embodiments, the system is configured to gather a number of requests, encapsulate each of the requests in a wrapper, split each of the encapsulated requests into sub-requests that are encapsulated in sub-wrappers, group the encapsulated sub-requests based on some attributes, and send the groups of encapsulated sub-requests to relevant data repositories. Each of the sub-wrapper that encapsulates a sub-request shares a portion of the wrapper. The wrapper that encapsulates a request may be associated with an identifier. The identifier associated with the wrapper may comprise a number of components, and each component of the identifier shares an aspect of the identifier. Each component of the identifier is associated with a sub-wrapper of the wrapper. The identifier may have a unique combination of its components. In other words, each component of the identifier is uniquely associated with its neighboring component(s). In this way, each sub-wrapper associated with an identifier component is uniquely associated with related sub-wrapper(s).

In some embodiments, the sub-requests of a request may be associated with an attribute. The attribute may comprise an indication of data sensitivity. The attribute may be associated with a value that indicates a level of data sensitivity. For example, a first sub-request may be associated with an attribute value of "confidential," and a second sub-request may be associated with an attribute value of "public." In some embodiments, a value associated with the attribute may be a numeric value. For example, a first sub-request may be associated with an attribute value of "5." A second sub-request may be associated with an attribute value of "10." In some embodiments, sub-requests of different requests but with a same attribute value may be assigned to a same group and sent to a relevant data repository in a batch.

The system described in the present application further provides a technical solution that enables the system to group and combine requested data elements, while securing the data elements during storage and transmission over the network. In some embodiments, the system is configured to gather a plurality of data elements that are encapsulated in a plurality of sub-wrappers, divide the plurality of data elements into multiple groups based on identifier components associated with the sub-wrappers, combine the data elements in each group based on a unique association between the identifier components, remove the sub-wrappers from the data elements in each group, and send the multiple groups of combined elements to relevant requestors.

In an exemplary embodiment, the system receives a plurality of data elements encapsulated in a plurality of sub-wrappers. The system then identifies a first data element encapsulated in a first sub-wrapper. The first sub-wrapper may be associated with a first component of a first identifier. Next, the system identifies a second data element encapsulated in a second sub-wrapper. The system then determines whether the second sub-wrapper is associated with a second component of the first identifier. Upon determining that the second sub-wrapper is associated with a second component of the first identifier, the system assigns the first data element and the second data element to a first group of data elements. The system may continue identifying any other data elements associated with components of the first identifier and assign the identified data elements to the first group of data elements. Then, the system combines the first group of data elements based a unique association between the components of the first identifier. The system may subsequently remove the sub-wrappers from the data elements in the first group of data elements, and send the combined first group of data elements to a relevant requestor.

In some embodiments, the system may further identify a second group of data elements associated with components of a second identifier. The system combines the second group of data elements based a unique association between the components of the second identifier. The system may subsequently remove the sub-wrappers from the data elements in the second group of data elements, and send the combined second group of data elements to a relevant requestor.

The system described in the present application is configured to provide a technical solution that achieves a technical improvement. For example, splitting a request into sub-requests may enable parallel processing of the sub-requests, thereby reducing processing time for the request. The splitting breaks down a large-size request into multiple small-size sub-requests. Transmission of the small-size sub-requests to multiple data repositories over a network, instead of sending duplicates of the large-size request, facilitates conserving computing resources. This solution divides the processing workload to increase the efficiency of CPU usage, and enables high throughput on concurrent workload. As a result, the system described in the present application provides a more efficient request processing path, thereby increasing overall throughput of the system.

Furthermore, by splitting a request into a plurality of sub-requests, different types of data within the sub-requests may be separated. It enables the system to inherently secure sensitive and/or confidential data stored over the network. For example, non-text type of sub-request may be separated from text type of sub-request, and the two types of sub-requests may be sent to different data repositories. Because a non-text type of sub-request may be potentially embedded with malware and the malware may rely on content in both non-text type of sub-request and text type of sub-request, such separating would disable the malware from executing its content.

A wrapper or a sub-wrapper as described in the present application may be configured to ensure data integrity and security during transmission over the network. A wrapper or a sub-wrapper may attach only "informational" message to a request, a sub-request, and/or a data element. The wrapper or the sub-wrapper may not tamper with the request, the sub-request, and/or the data element itself, thereby keeping the integrity of the request, the sub-request, and/or the data element. The unique associations between sub-wrappers of a wrapper may ensure securing sub-requests and/or data elements that are wrapped. For example, the system may reject or remove a sub-request and/or a data element in a sub-wrapper that is not related to any other sub-wrappers because such sub-request and/or data element may be a malware injected by a malicious actor.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1-7 of the drawings, like numerals being used for like and corresponding parts of the various drawings.

Conventional systems may send a single request to multiple data repositories sequentially. But this may increase processing time for the request, thereby may jeopardizing the request or subsequent requests by failing to meet a time requirement. On the other hand, conventional systems may send duplicative requests to multiple data repositories. But this consumes double computing resources such as memory and bandwidth. Such techniques that conventional systems may adopt could also create network traffic due to increased processing time and computing resources, thereby reducing an overall throughput of the systems. Furthermore, the requests may face malicious network activities during transmission over the network. For example, a malicious actor over the network may intercept a request and inject a malware in the request. Then, the malicious actor may use the malware to exfiltrate confidential data from a database where the request is sent. Furthermore, conventional systems may be unable to provide adequate network security to secure the requests and the requested information. As a result, these requests and the requested information may be vulnerable to attacks by malicious actors over the network.

In contrast, the following disclosed system describes a request processing system that reduces request processing time, increases overall throughput of the system while conserving computing resources, and increases data security associated with the storage and transmission of the requests and the requested information over the network.

Figure 1:
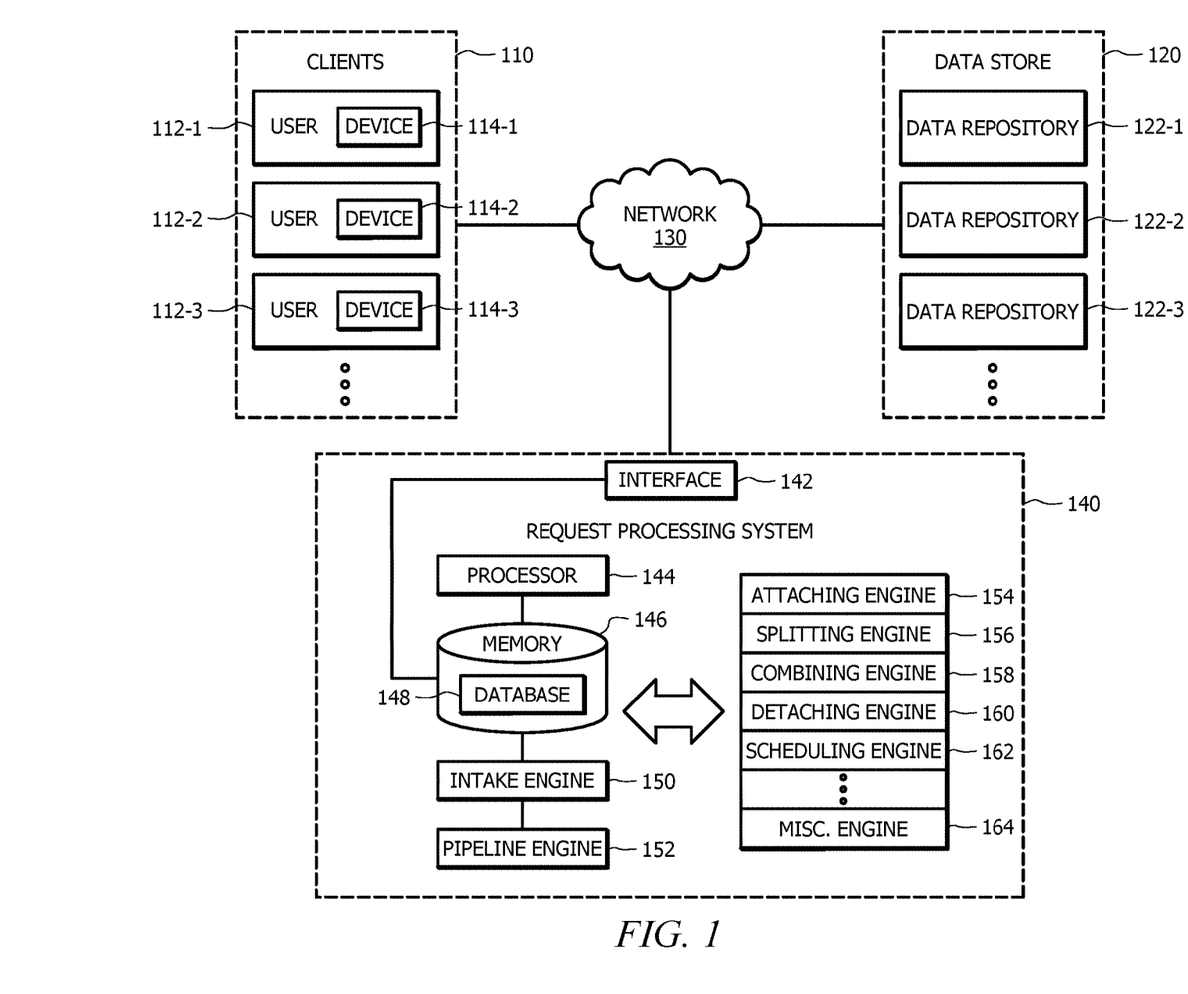
FIG. 1 illustrates an exemplary embodiment of a system for aggregating and processing requests and data elements.

FIG. 1 illustrates an exemplary embodiment of a system 100 for aggregating and processing requests and data elements, according to certain embodiments of the present disclosure. According to an embodiment, system 100 includes clients 110, data store 120, network 130, and request processing system 140. System 100 may further comprise any other suitable type and/or number of network devices (not shown). Example of other network devices include, but not limited to, web clients, web servers, user devices, mobile phones, computers, tablet computers, laptop computers, software as a service (SaaS) servers, databases, file repositories, file hosting servers, and/or any other suitable type of network device. System 100 may be configured as shown or in any other suitable configuration. Modifications, additions, or omissions may be made to system 100. System 100 may include more, fewer, or other components. Any suitable component of system 100 may include a processor, interface, logic, memory, or other suitable element.

Clients 110 comprises entities that access system 100. Clients 110 may include one or more users 112 (e.g., 112-1, 112-2, 112-3) associated with one or more devices 114 (e.g., 114-1, 114-2, 114-3). Users 112 may include businesses or other commercial organizations, government agencies, individuals, or any other suitable user. In certain embodiments, a user 112 may access system 100 by operating on a device 114. Examples of devices 114 include, but are not limited to, desktop computers, mobile phones, tablet computers, and laptop computers. Device 114 is generally configured to communicate data with other network devices in the system 100. Devices 114 are configured to communicate with request processing system 140 and data store 120. In one embodiment, device 114 is configured to establish a connection with the request processing system 140 to access network resources. Examples of network resources include, but are not limited to, cloud services, applications, databases, file repositories, hardware, or any other suitable type of shared hardware or software resources. For example, a user 112 may operate on a device 114 to send a request to request processing system 140 to request data from data store 120.

Data store 120 comprises any software, hardware, firmware, and/or combination thereof capable of storing information. In some embodiments, data store 120 comprises one or more data repositories 122 (e.g., 122-1, 122-2, 122-3), which may be of different types or the same type. Exemplary data repositories 122 may comprise individual data storage devices (e.g., disks, solid-state drives), which may be part of individual storage engines and/or may be separate entities coupled to storage engines within. In some embodiments, data repositories 122 may store third-party databases, database management systems, a file system, and/or other entities that include or that manage data repositories. Data repositories 122 may be locally located or remotely located to request processing system 140. In certain embodiments, each data repository 122 may be located at a different geographic location. For example, a first data repository 112 may be located at a first geographic location while a second data repository 122 may be located at a second geographic location.

Network 130 comprises any suitable network operable to facilitate communication between components of system 100, such as clients 110, data store 120, and request processing system 140. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Request processing system 140 is configured to aggregate and process request received from clients 110 and data elements received from data store 120. In some embodiments, request processing system 140 may comprise an interface 142, a processor 144, a memory 146, and one or more engines 150-164. The one or more engines 150-164 may be configured to act independently and/or in sync with one another. In some embodiments, the one or more engines 150-164 comprise an intake engine 150, a pipeline engine 152, an attaching engine 154, a splitting engine 156, a combining engine 158, a detaching engine 160, and a scheduling engine 162. The one or more engines 150-164 may further comprise other miscellaneous engines 164 to perform various functions for processing requests and data elements.

An engine described in the present disclosure may include hardware, software, or other engine(s). An engine may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of an engine may be performed by any suitable combination of one or more servers or other elements at one or more locations. In embodiments where engines represent a server, the server may be a private server, and the server may be a virtual or physical server. Additionally, an engine may include any suitable element that functions as a server.

Request processing system 140 may have multiple sub-systems and components. The multiple sub-systems and components may act independently and/or in sync with one another. Request processing system 140 may be configured as shown or in any other suitable configuration. Modifications, additions, or omissions may be made to request processing system 140. Request processing system 140 may include more, fewer, or other components.

Interface 142 comprises any device operable to receive input, send output, process the input or output, or perform other suitable operations for requesting processing system 140. Interface 142 includes any port or connection, real or virtual, including any suitable hardware or software, including protocol conversion and data processing capabilities, to communicate through network 130. In certain embodiments, interface 141 includes a user interface (e.g., physical input, graphical user interface ("GUI"), touchscreen, buttons, switches, transducer, or any other suitable method to receive input from a user). In some embodiments, interface 142 may be configured to communicate with clients 110 and data store 120. For example, interface 142 may be configured to receive one or more requests from one or more users 112 operating on one or more devices 114. Interface 142 may be further configured to receive one or more data elements from one or more data repositories 122. In some embodiment, the received requests and/or data elements are further stored in memory 146.

Processor 144 comprises one or more processors operably coupled to memory 146. Processor 144 comprises any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). Processor 144 may be a programmable logic device, a microcontroller, a microprocessor, or any suitable combination of the preceding. Processor 144 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. In certain embodiments, processor 144 communicatively couples to other components of system 100, such as an engine (e.g., engines 150-164), an interface (e.g. interface 142), a memory (e.g., memory 146), a database (e.g., database 148), or any other suitable component.

Memory 146 comprises any device operable to store, either permanently or temporarily, data, operational software, or other information for a processor. In some embodiments, memory 146 comprises one or more disks, tape drives, or solid-state drives, and may be used as an over-flow data storage device, to store programs when such programs are selected for execution, and to store instructions and data that are read during program execution. Memory 146 may comprise any one or a combination of volatile or non-volatile local or remote devices suitable for storing information. For example, memory 146 may comprise random access memory (RAM), read only memory (ROM), magnetic storage devices, optical storage devices, semiconductor storage devices, or any other suitable information storage device or a combination of these devices. In some embodiments, memory 146 may further comprise database 148. Database 148 may be configured to store requests received from clients 110 via interface 142. Database 148 may be further configured to store data elements received from data store 120 via interface 142.

Intake engine 150 may be configured to gather requests received from clients 110 for further processing by other components of system 100. In some embodiments, intake engine 150 may retrieve a subset of the requests stored in database 148 of memory 146. For example, intake engine 150 may periodically retrieve a pre-determined number of the requests stored in database 148, at a pre-determined time interval (e.g., every 10 minutes, every hour), either in real time or in a back state. In an exemplary embodiment, intake engine 150 may retrieve a subset of the requests stored in database 148 that are received form one or more users 112. For example, intake engine 150 may retrieve a first request of a first user and a second request of a second user. Intake engine 150 may also retrieve a third request and a fourth request of a third user.

Intake engine 150 may be further configured to gather data elements received from data store 120 for further processing. In some embodiments, intake engine 150 may retrieve a subset of the data elements stored in database 148 of memory 146. For example, intake engine 150 may periodically retrieve a pre-determined number of the data elements stored in database 148, at a pre-determined time interval (e.g., every 10 minutes, every hour), either in real time or in a back state. In an exemplary embodiment, intake engine 150 may retrieve a subset of the data elements stored in database 148 that are received from one or more data repositories 122. For example, intake engine 150 may retrieve a first data element stored in database 148 that is received from a first data repository 122 in response to a first request. Intake engine 150 may also retrieve a second data element stored in database 148 that is received from a second data repository 122 in response to the first request. The intake engine 150 may also retrieve a third data element stored in database 148 that is received from the first data repository 122 in response to a second request.

Pipeline engine 152 may be configured to prepare requests in a pipeline for further processing by other components of the system 100. In some embodiments, pipeline engine 152 is configured to be communicatively coupled to the intake engine 150. In an exemplary embodiment, pipeline engine 152 is configured to collect a plurality of requests retrieved by intake engine 150 and put them in a pipeline. In some embodiments, the pipelined requests may be further processed by one or more engines 154-164. Pipeline engine 152 may also be configured to put data elements in a pipeline for further processing by other components of system 100. In an exemplary embodiment, pipeline engine 152 is configured to collect a plurality of data elements retrieved by intake engine 150 and put them in a pipeline. In some embodiments, the pipelined data elements may be further processed by one or more engines 154-164.

Figure 2:
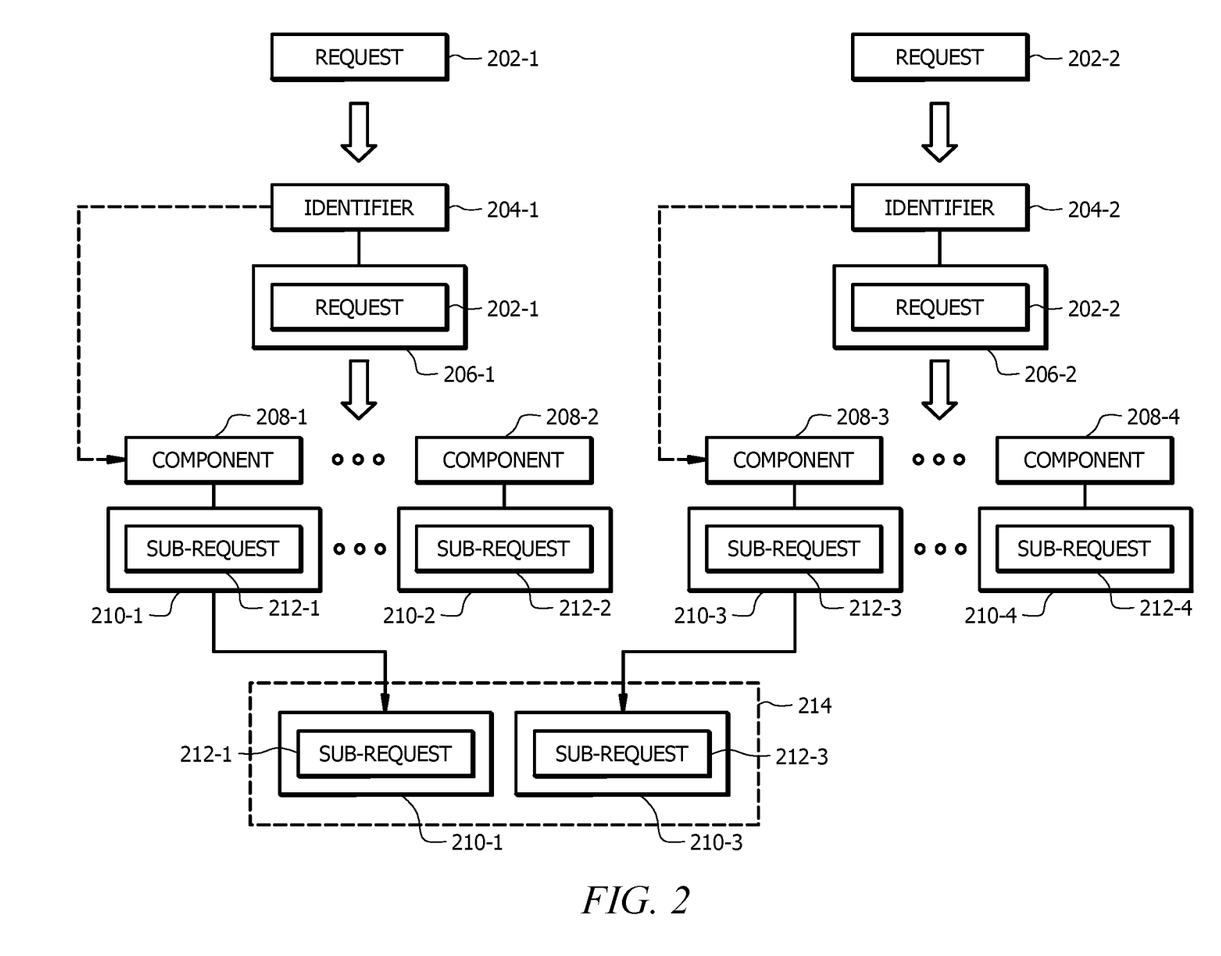
FIG. 2 illustrates an embodiment of splitting requests into sub-requests and grouping the sub-requests.
Figure 3:
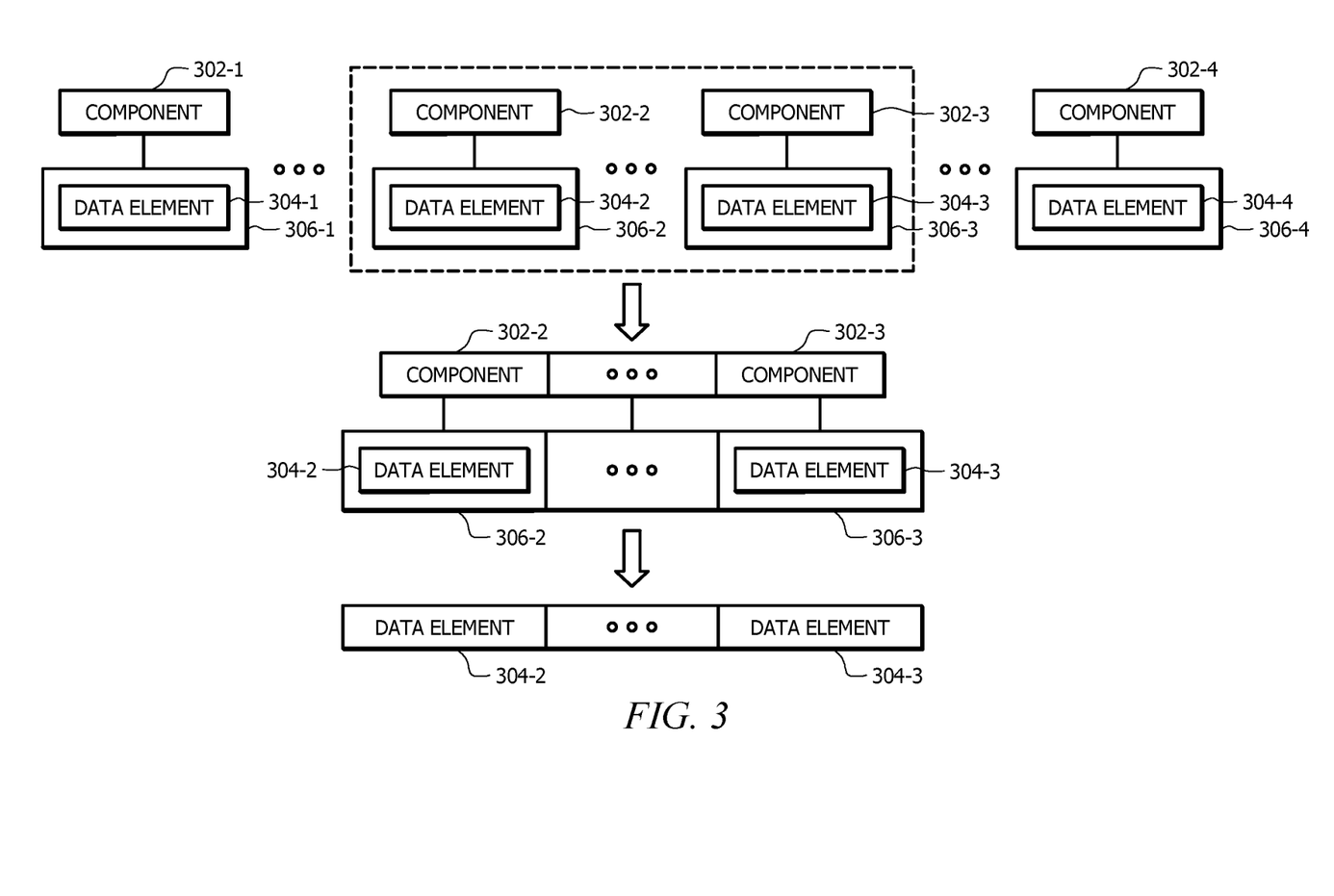
FIG. 3 illustrates an embodiment of grouping data elements and combining the grouped data elements.

The functions of some of the one or more engines 154-164 may be understood with reference to FIG. 2 and FIG. 3.

Referring to FIG. 2, attaching engine 154 may be configured to attach a wrapper 206 to a request 202. The request may be split into a plurality of sub-requests 212. Attaching engine 154 may also attach sub-wrappers 210 of the wrapper to the sub-requests of the request. A wrapper or a sub-wrapper may be an artificial layer that encapsulates a request, a sub-request, or a data element in response to a sub-request.

Note that a wrapper 206 or a sub-wrapper 210 does not tamper with the underlying data within a request 202, a sub-request 212, or a data element 304 because they could be encrypted. In this way, it allows the system to not disturb the underlying data of the request, the sub-request, or the data element. In some embodiments, a wrapper 206 or a sub-wrapper 210 is a data or data structure that precedes or frames a request 202, a sub-request 212, or a data element 304. In one embodiment, a wrapper 206 or a sub-wrapper 210 may consist of a header that precedes the encapsulated data and the trailer that follows it. In some embodiments, a wrapper 206 or a sub-wrapper 210 can be used to determine who has access to look at or change the data that is wrapped. For example, during transmission over a network, a wrapper 206 or a sub-wrapper 210 is the data that is put in front of or around a request 202, a sub-request 212, or a data element 304 and provides information about it. The wrapper or the sub-wrapper may also protect the request, the sub-request, or the data element from view to anyone other than the intended recipient.

In some embodiments, a wrapper 206 is associated with an identifier 204. An identifier 204 associated with a wrapper 206 may comprise any identifying scheme including, but not limited to, an agent, a tag, a matrix, a string, a header, or a footer. In some embodiments, a wrapper 206 is split into a plurality of sub-wrappers 210. An identifier 204 associated with the wrapper may comprise a plurality of components 208, and each component of the identifier is associated with a sub-wrapper of the wrapper. Note that the components of the identifier are related to each other. In some embodiments, each component of the identifier may be related to one or more neighboring components in a certain and unique way. For example, a first identifier 204-1 associated with a first wrapper 206-1 may comprise a plurality of components 208, including a first component 208-1, a second component 208-2, and one or more components (not shown). The first component 208-1 may be related only to the second component 208-2. The second component 208-2 may be related to both the first component 208-1 and a third component (not shown). The third component may be related to only the second component 208-2. Accordingly, sub-wrappers associated with the components of the first identifier also match a certain and unique way. An example analogous to sub-wrappers 210 of a wrapper 206 could be puzzle pieces of a jigsaw puzzle game. The puzzle pieces can be only assembled and interlocked in a certain and unique way to complete a picture for the jigsaw puzzle game. Sub-wrappers 210 of a wrapper 206 that encapsulate sub-requests 212 of a request 202, is similar to the "puzzle pieces" which can be only assembled in a certain way. This allows the system not to temper with the sub-requests and the data elements but still have an ability to reassemble the data elements encapsulated in the sub-wrappers.

Splitting engine 156 may be configured to split a request 202 into a plurality of sub-requests 212. For example, splitting engine 156 may be configured to split a request 202 encapsulated in a wrapper 206 into a plurality of sub-requests 212. In one embodiment, splitting engine 156 may split a request 202 into two sub-requests 212. In another embodiment, splitting engine 156 may split a request 202 into three sub-requests 212. In some embodiments, splitting engine 156 may split a request 202 into a plurality of sub-requests 212 based on an attribute. For example, sub-requests 212 of a request 202 may be associated with an attribute. In one embodiment, the attribute may comprise an indication of data sensitivity, and the attribute may be associated with a value that indicates a level of data sensitivity. For example, a first sub-request 212-1 may be associated with an attribute value of "confidential," and a second sub-request 212-2 may be associated with an attribute value of "public." Splitting engine may split a request (e.g., 202-1) into a first sub-request (e.g., 212-1) having an attribute value of "confidential," and a second sub-request (e.g., 212-2) having an attribute value of "public." In some embodiments, a value associated with the attribute may be a numeric value. For example, a first sub-request (e.g., 212-1) may be associated with an attribute value of "5." A second sub-request (e.g., 212-2) may be associated with an attribute value of "10."

In some embodiment, splitting engine 156 may be configured to split a request 202 into a plurality of sub-requests 212 based on data types associated with the sub-requests 212. In an exemplary embodiment, splitting engine 156 may split a request (e.g., 202-1) into a first sub-request (e.g., 212-1) having text data, and a second sub-request (e.g., 212-2) having image data. Note that non-text data (e.g., image data) may be embedded with a malware by a malicious actor over the network. In some embodiments, request processing system 140 may send the first sub-request having text data to a first data-repository (e.g., 122-1) that stores confidential data, and the second sub-request having image data to a second data-repository (e.g., 122-2) that stores public data. In this way, a malware embedded in the image data can no longer function because it needs both the text data and image data to execute the content of the malware. This enable the system to inherently secure sensitive and/or confidential data stored within the network.

Splitting engine 156 may be further configured to split a wrapper 206 encapsulating a request 202 into a plurality of sub-wrappers 210. Each of the sub-wrappers encapsulates a sub-request 212 of the request. The wrapper encapsulating the request may be associated with an identifier 204. The identifier may comprise a plurality of components 208, and each component of the identifier is associated with a sub-wrapper of the wrapper. Each component of the identifier is uniquely associated with one or more neighboring components. For example, splitting engine 156 may split a request into three sub-requests, namely a first sub-request, a second sub-request, and a third sub-request. Splitting engine 156 may also split a wrapper encapsulating the request into three sub-wrappers, namely a first sub-wrapper, a second sub-wrapper, and a third sub-wrapper. The first sub-wrapper, the second sub-wrapper, and the third sub-wrapper encapsulate the first sub-request, the second sub-request, and the third sub-request respectively. The wrapper may be associated with an identifier comprising three components, namely a first component, a second component, and a third component. The first component, the second component, and the third component of the identifier are associated with the first sub-wrapper, the second sub-wrapper, and the third sub-wrapper, respectively. The first component may be associated only with the second component. The second component may be associated with both the first component and the third component. The third component may be associated only with the second component. Accordingly, the sub-wrappers that are associated with the three components of the identifier are uniquely associated with each other.

Splitting engine 156 may be further configured to divide a plurality of sub-requests 212 into multiple groups based on an attribute value associated with each sub-request. In an exemplary embodiment, sub-requests of different requests but with a same attribute value may be assigned to a same group and sent to a relevant data repository in a batch. For example, splitting engine 156 may identify a first sub-request 212-1 of a first request 202-1 having an attribute value of "confidential," and a first sub-request 212-3 of a second request 202-2 having an attribute value of "confidential." Splitting engine 156 may then assign the two sub-requests having the same attribute value of "confidential" to a group 214. In some embodiments, request processing system 140 may send the group of sub-requests having the attribute value of "confidential" to a relevant data repository 122 that stores confidential data.

Splitting requests into a number of sub-requests and grouping the sub-requests based on some attributes enable the system to reduce request processing time, increase overall throughput of the system while conserving computing resources. For example, splitting a request 202 into sub-requests 212 may enable parallel processing of the sub-requests, thereby reducing processing time for the request. Also, such splitting represents a breakdown of a large size request into small size sub-requests. Transmission of the small size sub-requests to multiple data repositories over a network, instead of sending duplicates of the large size request, facilitates conserving computing resources. This divides the processing workload to increase the efficiency of CPU usage, and enables high throughput on concurrent workload. As a result, the system described in the present application provides a more efficient request processing path, thereby increasing overall throughput of the system.

Referring to FIG. 3, combining engine 158 may be configured to combine data elements 304 in response to sub-requests 212. In some embodiments, combining engine 158 may be configured to sort a plurality of data elements 304 based on identifier components 301 associated with sub-wrappers 306 encapsulating the data elements. For example, combining engine 158 may identify a first data element 304-2 encapsulated by a first sub-wrapper 306-2 associated with a first component 302-2 of an identifier, a second data element 304-3 encapsulated by a second sub-wrapper 306-3 associated with a second component 302-3 of the identifier, and, if any, one or more data elements 304 encapsulated by sub-wrappers 210 associated with other components of the identifier. Combining engine 158 may then assign these data elements associated with the components of the identifier to a group. In some embodiments, combining engine 158 combines the data elements in the group associated with the components of the identifier. Note that because the components of the identifier are related to each other in a certain and unique way, combining engine 158 may only combine the data elements in a certain and unique way based on the identifier components associated with their sub-wrappers. For example, a first component of an identifier associated a first data element may be only related to a second component of the identifier associated with a second data element. The second component of the identifier associated with the second data element may be further related to a third component of the identifier associated with a third data element. And the third component of the identifier associated with the third data element may be only related to the second component of the identifier associated with the second data element. Combining engine 158 may then combine the three data elements by attaching the second data element to the first data element, and attaching the third data element to the second data element. This allows the system not to temper with the data elements but still have an ability to reassemble the data elements encapsulated in the sub-wrappers.

Detaching engine 160 may be configured to detach a wrapper 206 from a request 202. Detaching engine 160 may be further configured to detach a sub-wrapper 210 from a sub-request 212 or a data element 304. In one exemplary embodiment, combining engine 158 combines two or more data elements 304 encapsulated in sub-wrappers 306 in response to two or more sub-requests 212 of a request 202. Detaching engine 160 may remove the sub-wrappers from these data elements. Note that detaching engine 160 does not temper with the data within the data elements. This allows the system to have an ability to reassemble the data elements encapsulated in the sub-wrappers, while not tampering with the data within the data elements.

Scheduling engine 162 may be configured to schedule sub-requests 212 for fulfillment. Scheduling engine 162 may schedule a plurality of sub-requests 212 based on one or more criteria. The one or more criteria may comprise, but not limited to, priority associated with a sub-request, a time cutoff associated with a sub-request, a size of a sub-request, or a seniority associated with a user that sends a request comprising a sub-request. For example, a first sub-request may be associated with a time cutoff of 5:00 pm, and a second sub-request received at a time later than the first sub-request may be associated with a time cutoff of 9:00 am the same day. Scheduling engine 162 may schedule the second sub-request for processing before the first sub-request. In another example, a first sub-request may be associated with a first user that has a title of "technology manager," and a second sub-request received at a time later than the first sub-request may be associated with a second user that has a title of "chief technology officer (CTO)." Scheduling engine 162 may schedule the second sub-request for processing before the first sub-request.

Request processing system 140 may further comprises miscellaneous engines 164 including, but not limited to, an encoding engine, a decoding engine, a malware engine, an examination engine. An encoding engine may be configured to encode a request 202, a sub-request 212, or a data element 304. In one embodiment, the encoding engine may convert a request 202, a sub-request 212, or a data element 304 into a specialized format for storage and efficient transmission over a network. A decoding engine may be configured to decode a request 202, a sub-request 212, or a data element 304. In one embodiment, the decoding engine may convert an encoded request, an encoded sub-request, or an encoded data element into an original format. A malware engine may be configured to detect potential malware embedded in a request 202, a sub-request 212, or a data element 304. In some embodiments, the malware engine may detect a malware in a sub-request 212 and remove the sub-request from request processing system 140. An examination engine may be configured to examine a request 202, a sub-request 212, or a data element 304 for consistency and/or integrity. In some embodiments, the examination engine may examine a request 202, a sub-request 212, or a data element 304 and find a data loss or data corruption. Such unintended changes to data may be a result of a storage, retrieval or processing operation, including malicious intent, unexpected hardware failure, and human error. The examination engine may send a notification to system 100 to inform such failure of data integrity.

Figure 4:
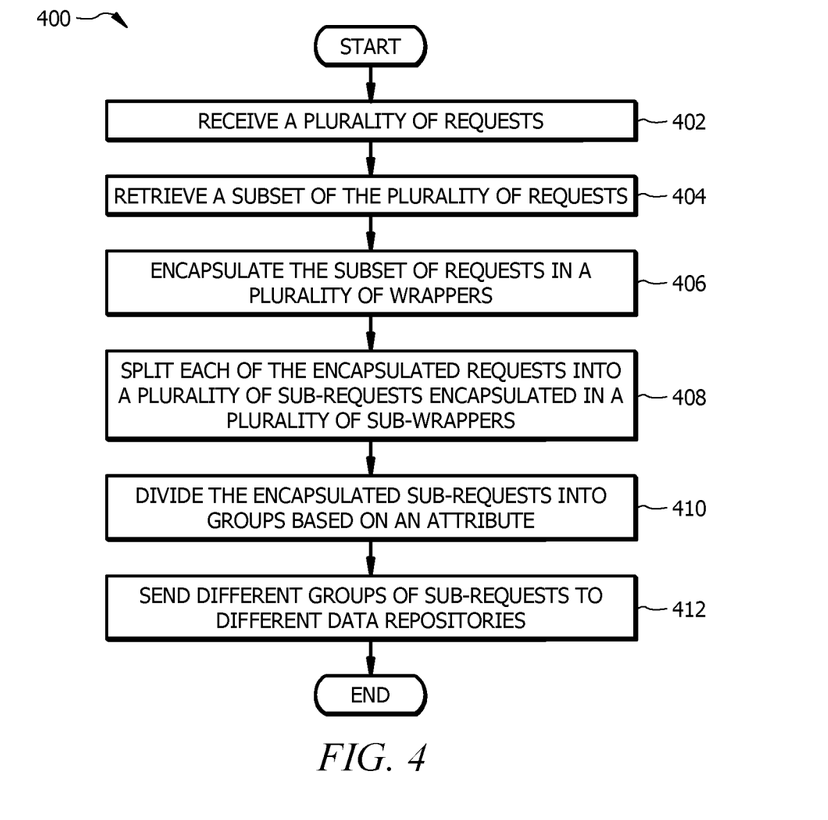
FIG. 4 illustrates a flow diagram of an embodiment of a method for aggregating and processing requests.

FIG. 4 illustrates a flow diagram of an embodiment of a method 400 for aggregating and processing requests. System 100 implements method 400 to optimize the path of requests processing. Method 400 is an embodiment of a particular sequence of steps or rules that allows the system 100 to achieve the previously described technical improvement that includes reducing request processing time, increasing overall throughput of the system while conserving computing resources, and increasing data security associated with the storage and transmission of the requests and the request information over a network. The following is a non-limiting example that illustrates how system 100 implements method 400.

At step 402, request processing system 140 receives a plurality of requests 202 from clients 110 over network 130. For example, request processing system 140 may receive the plurality of requests from one or more users 112 operating on one or more devices 114. Request processing system 140 may receive the plurality of requests via interface 142 and store the requests temporarily in database 148 of memory 146 for furthering processing.

At step 404, requesting processing system 140 retrieves a subset of the plurality of requests stored in database 148. For example, intake engine 150 of the requesting processing system 140 may scan database 148 periodically at a given time interval (e.g., every 10 minutes, every hour), either in real time or in a back state. Intake engine 150 may retrieve a pre-determined number of requests (i.e., a subset of the plurality of requests) stored in database 148.

At step 406, requesting processing system 140 encapsulates the subset of the requests in a plurality of wrappers 206. Note that a wrapper 206 does not tamper with the underlying data within a request 202 because the request could be encrypted. In this way, it allows the system to not disturb the underlying data of a request. In some embodiments, a wrapper 206 is a data or data structure that precedes or frames a request. In one embodiment, a wrapper 206 may consist of a header that precedes the encapsulated request and the trailer that follows it. In some embodiments, a wrapper 206 can be used to determine who has access to look at or change a request 202 that is wrapped. For example, during transmission over a network, a wrapper 206 is the data that is put in front of or around a request and provides information about it. The wrapper may also protect the request from view to anyone other than the intended recipient. In some embodiments, a wrapper 206 is associated with an identifier 204. An identifier 204 associated with a wrapper 206 may comprise any identifying scheme including, but not limited to, an agent, a tag, a matrix, a string, a header, or a footer.

At step 408, requesting processing system 140 splits each of the encapsulated requests into a plurality of sub-requests 212 encapsulated in a plurality of sub-wrappers 210. For example, splitting engine 156 may split a request 202 into a plurality of sub-requests 212 based on an attribute. In one embodiment, the attribute may comprise an indication of data sensitivity. The attribute may be associated with a value that indicates a level of data sensitivity. For example, splitting engine may split a request 202-1 into a first sub-request 212-1 having an attribute value of "confidential," and a second sub-request 212-2 having an attribute value of "public." Splitting engine 156 further splits each wrapper 206 encapsulating the request into a plurality of sub-wrappers 210 so that each sub-wrapper encapsulates a sub-request of the request. As noted above, a wrapper 206 is associated with an identifier 204. The identifier may comprise a plurality of components 208 so that each component of the identifier is associated with a sub-wrapper of the wrapper. Note that components 208 of an identifier 204 are related to each other. In some embodiments, each component 208 of an identifier 204 may be related to one or more neighboring component in a certain and unique way. Accordingly, the sub-wrappers associated with the components of the identifier also match in a certain and unique way. This allows the system not to temper with the sub-requests and the data elements that are wrapped but still have an ability to reassemble the data elements encapsulated in the sub-wrappers.

At step 410, requesting processing system 140 divides the encapsulated sub-requests 212 into multiple groups based on an attribute associated with the sub-requests. For example, sub-requests 212 of different requests 202 but with a same attribute value may be assigned to a same group and sent to a relevant data repository 122 in a batch. For example, requesting processing system 140 may assign encapsulated sub-requests having an attribute value of "confidential" into a first group, and assign encapsulated sub-requests having an attribute value of "public" into a second group.

At step 412, requesting processing system 140 sends different groups of sub-request 202 to different data repositories 122. For example, request processing system 140 may send a first group of sub-requests having an attribute value of "confidential" to a relevant data repository (e.g., 122-1) that stores confidential data. Request processing system 140 may send a second group of sub-requests having an attribute value of "public" to a relevant data repository (e.g., 122-2) that stores public data.

Figure 5:
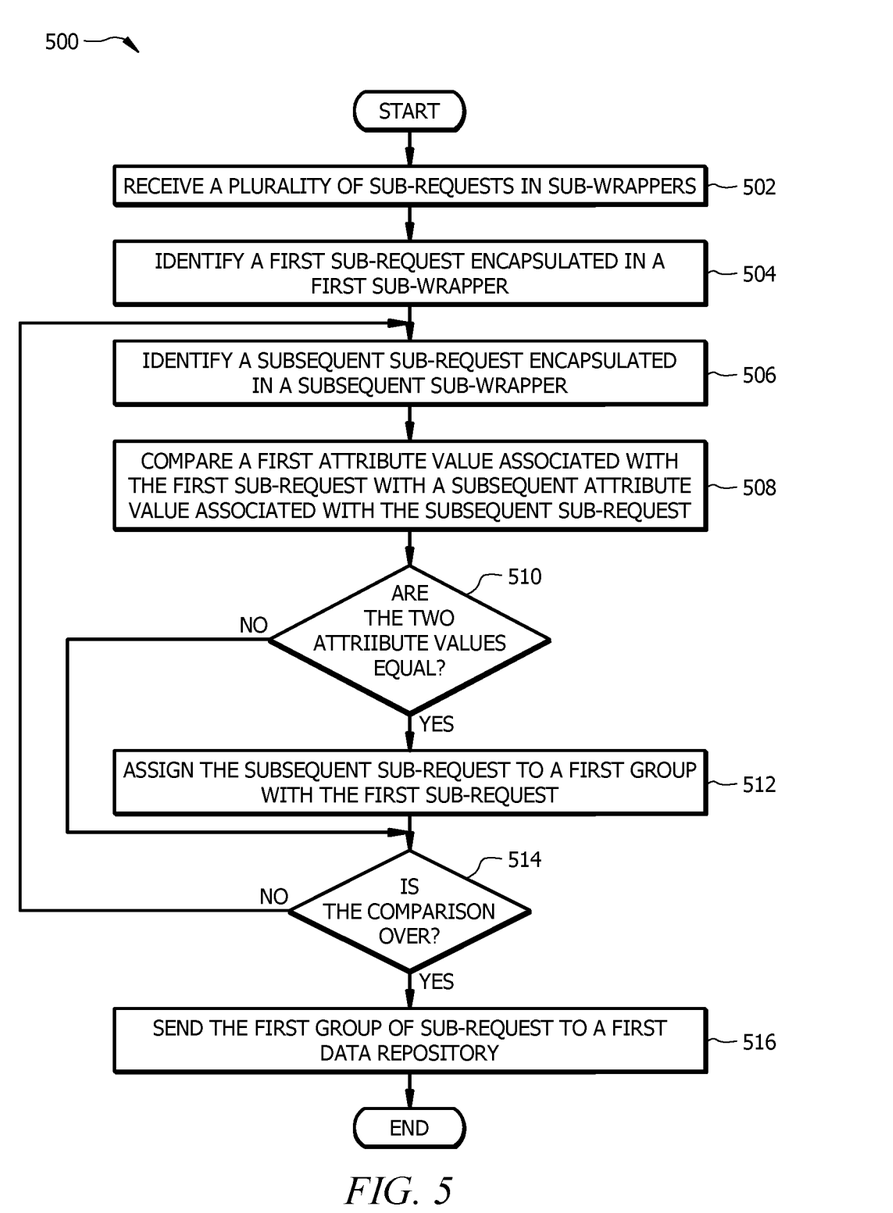
FIG. 5 illustrates a flow diagram of an embodiment of a method for grouping sub-requests.

FIG. 5 illustrates a flow diagram of an embodiment of a method 500 for grouping sub-requests. Method 500 is an embodiment of a particular sequence of steps or rules that allows the system 100 to identify sub-requests having a same attribute value. The following is a non-limiting example that illustrates how system 100 implements method 500.

At step 502, requesting processing system 140 receives a plurality of sub-requests 212 encapsulated in a plurality of sub-wrappers 210. At step 504, requesting processing system 140 identifies a first sub-request (e.g., 212-1) encapsulated in a first sub-wrapper (e.g., 210-1). The first sub-request may be associated with a first attribute value. At step 506, requesting processing system 140 identifies a subsequent sub-request (e.g., 212-3) encapsulated in a subsequent sub-wrapper (e.g., 210-3). The subsequent sub-request may be associated with a subsequent attribute value. At step 508, requesting processing system 140 compares the two attribute values. At step 510, requesting processing system 140 determines whether the two attribute values are equal. At step 512, upon determining that the two attribute values are equal, requesting processing system 140 assigns the subsequent sub-request to a first group 214 with the first sub-request. At step 514, requesting processing system 140 determines whether all the sub-requests have been exhausted for the comparison. At step 516, upon determining that all the sub-requests have been exhausted for the comparison, requesting processing system 140 sends the first group of sub-requests to a relevant data repository 122.

Figure 6:
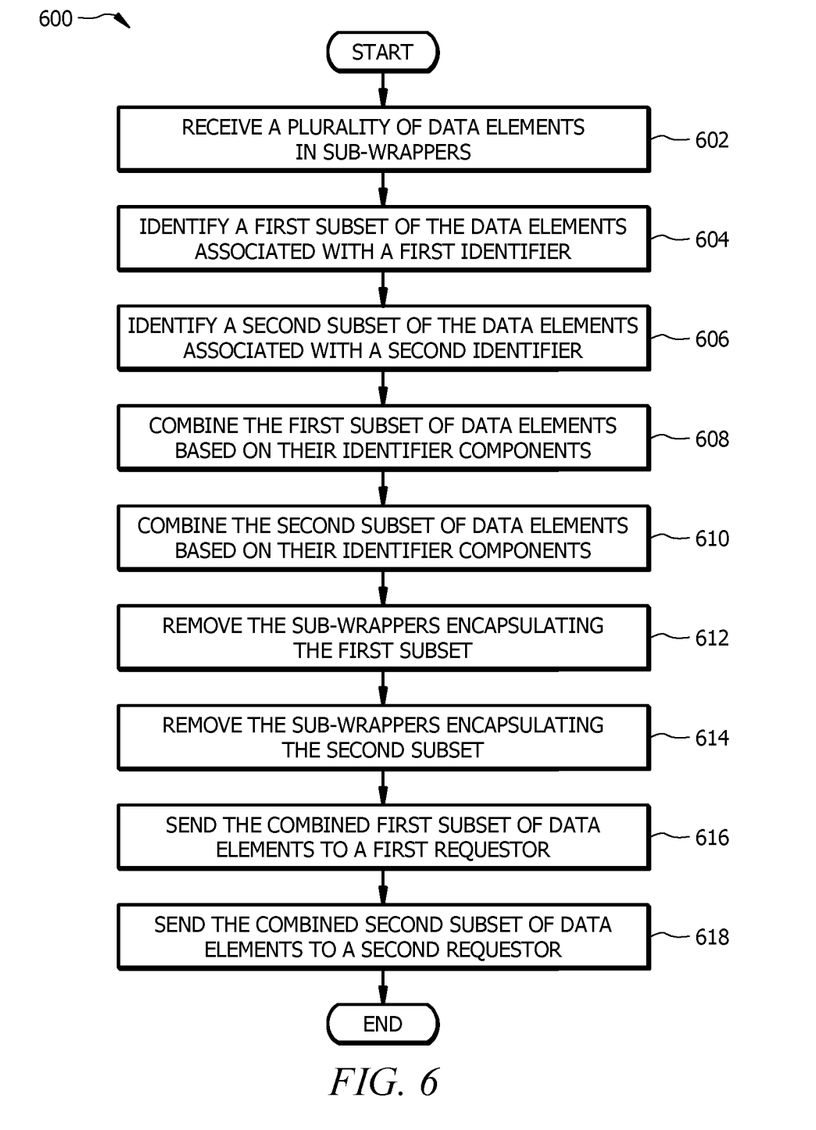
FIG. 6 illustrates a flow diagram of an embodiment of a method for aggregating and processing data elements.

FIG. 6 illustrates a flow diagram of an embodiment of a method for aggregating and processing data elements. System 100 implements method 600 to optimize the path of processing data elements that are used to fulfill data requests. Method 600 is an embodiment of a particular sequence of steps or rules that allows system 100 to efficiently group and combine the data elements, while securing the data elements during storage and transmission over the network. The following is a non-limiting example that illustrates how system 100 implements method 600.

At step 602, request processing system 140 receives a plurality of data elements 304 from data store 120 over network 130. For example, request processing system 140 may receive the plurality of data elements from one or more data repositories 122. Request processing system 140 may receive the plurality of data elements via interface 142 and store the data elements temporarily in database 148 of memory 146 for furthering processing.

At step 604, requesting processing system 140 identifies a first subset of the data elements stored in database 148. For example, intake engine 150 of the requesting processing system 140 may scan database 148 periodically at a given time interval (e.g., every 10 minutes, every hour), either in real time or in a back state. Intake engine 150 may retrieve a first subset of data elements associated with a first identifier 204 from database 148. Note that each data element in the first subset may be encapsulated in a sub-wrapper 306 associated with a component 208 of the first identifier, and the components of the first identifier are uniquely related to each other.

At step 606, requesting processing system 140 identifies a second subset of the data elements stored in database 148. For example, intake engine 150 of the requesting processing system 140 may scan database 148 periodically at a given time interval (e.g., every 10 minutes, every hour), either in real time or in a back state. Intake engine 150 may retrieve a second subset of data elements associated with a second identifier 204 from database 148. Note that each data element in the second subset may be encapsulated in a sub-wrapper 306 associated with a component 208 of the second identifier, and the components of the second identifier are uniquely related to each other.

At step 608, requesting processing system 140 combines the first subset of data elements based on the unique association between the components of the first identifier. As noted above, the components of the first identifier are uniquely related to each other. Accordingly, the sub-wrappers associated with the components of the first identifier are also uniquely related to each other. This allows the system to have an ability to reassemble the data elements encapsulated in the sub-wrappers.

At step 610, requesting processing system 140 combines the second subset of data elements based on the unique association between the components of the second identifier.

At step 612, requesting processing system 140 removes the sub-wrappers that encapsulates the first subset of data elements.

At step 614, requesting processing system 140 removes the sub-wrappers that encapsulates the second subset of data elements.

At step 616, requesting processing system 140 sends the combined first subset of data element to a first requestor that requested these data elements.

At step 618, requesting processing system 140 sends the combined second subset of data element to a second requestor that requested these data elements.

Figure 7:
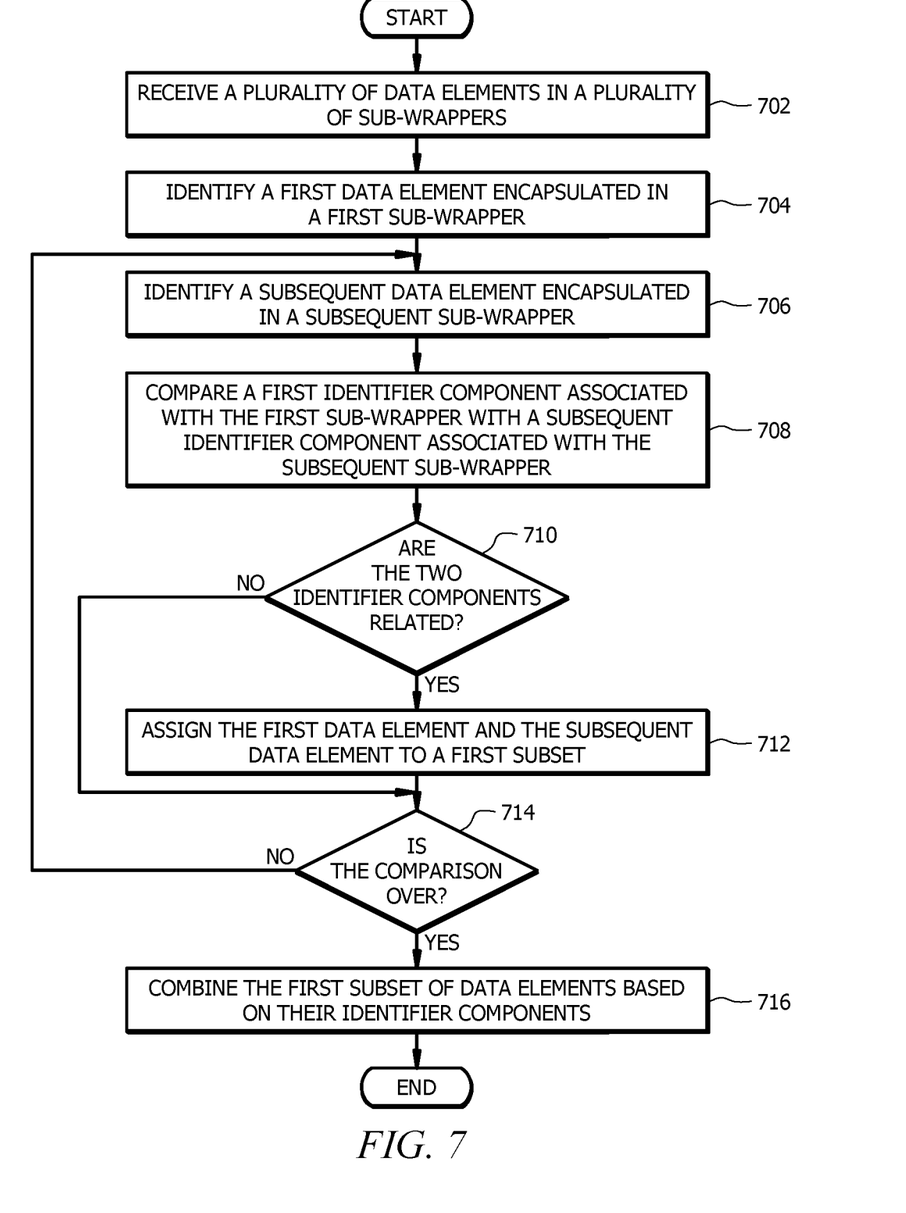
FIG. 7 illustrates a flow diagram of an embodiment of a method for grouping and combining data elements, according to certain embodiments of the present disclosure.

FIG. 7 illustrates a flow diagram of an embodiment of a method 700 for grouping and combining data elements. Method 700 is an embodiment of a particular sequence of steps or rules that allows the system 100 to identify data elements associated with a same identifier. The following is a non-limiting example that illustrates how system 100 implements method 700.

At step 702, requesting processing system 140 receives a plurality of data elements 304 encapsulated in a plurality of sub-wrappers 306. At step 704, requesting processing system 140 identifies a first data element (e.g., 304-2) encapsulated in a first sub-wrapper (e.g., 306-2). The first sub-wrapper may be associated with a first identifier component (e.g., 302-2). At step 706, requesting processing system 140 identifies a subsequent data element (e.g., 304-3) encapsulated in a subsequent sub-wrapper (e.g., 306-3). The subsequent sub-wrapper may be associated with a subsequent identifier component (e.g., 302-3). At step 708, requesting processing system 140 compares the two identifier components. At step 710, requesting processing system 140 determines whether the two identifier components are related. At step 712, upon determining that the two identifier components are related to a same identifier, requesting processing system 140 assigns the subsequent data element to a first subset of data elements with the first data element. At step 714, requesting processing system 140 determines whether all the data elements have been exhausted for the comparison. At step 716, upon determining that all the data elements have been exhausted for the comparison, requesting processing system 140 combines the first subset of data elements based on an association between their identifier components.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for fulfilling data requests, comprising:
    one or more interfaces operable to receive a plurality of data elements, the plurality of data elements comprising at least:
        a first data element in response to a first sub-request, the first data element encapsulated in a first sub-wrapper; and
        a second data element in response to a second sub-request, the second data element encapsulated in a second sub-wrapper;
    a memory operable to store the received plurality of data elements; and
    one or more processors communicatively coupled to the memory and operable to:
        upon determining that the first sub-wrapper and the second sub-wrapper are associated with a first identifier, combine the encapsulated first data element and the encapsulated second data element;
        remove the first sub-wrapper from the first data element and the second sub-wrapper from the second data element; and send the combined first data element and the second data element to a first requestor in response to a first request;

wherein:
the one or more interfaces are further operable to receive a third data element in response to a third sub-request, the third data element encapsulated in a third sub-wrapper;
the third sub-wrapper is associated with a second identifier that is different from the first identifier; and
the third sub-wrapper is not combined with the first data element and the second data element because the second identifier is different from the first identifier.

2. The system of claim 1, wherein
the first sub-wrapper is associated with a first component of the first identifier, and
the second sub-wrapper is associated with a second component of the first identifier.

3. The system of claim 2, wherein the first component of the first identifier is uniquely associated with the second component of the first identifier.

4. The system of claim 3, wherein the encapsulated first data element and the encapsulated second data element are combined based on the unique association between the first component and the second component of the first identifier.

5. A method for fulfilling data requests, comprising:
receiving, at an interface, a plurality of data elements, the plurality of data elements comprising at least:
a first data element in response to a first sub-request, the first data element encapsulated in a first sub-wrapper;
a second data element in response to a second sub-request, the second data element encapsulated in a second sub-wrapper; and
a third data element in response to a third sub-request, the third data element encapsulated in a third sub-wrapper, wherein the third sub-wrapper is associated with a second identifier that is different from a first identifier, and the third sub-wrapper is not combined with the first data element and the second data element because the second identifier is different from the first identifier;
upon determining that the first sub-wrapper and the second sub-wrapper are associated with the first identifier, combining the encapsulated first data element and the encapsulated second data element;
removing, by the processor, the first sub-wrapper from the first data element and the second sub-wrapper from the second data element;
sending, by the processor, the combined first data element and the second data element to a first requestor in response to a first request.

6. The method of claim 5, wherein
the first sub-wrapper is associated with a first component of the first identifier; and
the second sub-wrapper is associated with a second component of the first identifier.

7. The method of claim 6, wherein the first component of the first identifier is uniquely associated with the second component of the first identifier.

8. The method of claim 7, wherein the encapsulated first data element and the encapsulated second data element are combined based on the unique association between the first component and the second component of the first identifier.

9. A method for grouping data elements, comprising:
receiving, at an interface, a plurality of data elements from a plurality of data repositories, each data element encapsulated in a sub-wrapper associated with a component of an identifier;
identifying, by a processor, a first subset of the plurality of data elements, each data element of the first subset encapsulated in a sub-wrapper associated with a component of a first identifier;
combining, by the processor, the first subset of data elements based on the components of the first identifier;
removing, by the processor, the sub-wrappers encapsulating the first subset of data elements;
sending, by the processor, the combined first subset of data elements to a first requestor;
identifying, by the processor, a second subset of the plurality of data elements, each data element of the second subset encapsulated in a sub-wrapper associated with a component of a second identifier; and
determining, by the processor, that the second identifier is different from the first identifier; and
determining, by the processor, not to combine the second subset of the plurality of data elements with the first subset of data elements because the second identifier is different from the first identifier.

10. The method of claim 9, wherein:
each component of the first identifier is uniquely associated with one or more neighboring components of the first identifier, and
each sub-wrapper encapsulating a data element of the first subset of data elements is uniquely associated with one or more neighboring sub-wrappers.

* * * * *